United States Patent
Thevis et al.

[15] 3,669,348
[45] June 13, 1972

[54] APPARATUS FOR SENSING DIGITAL INFORMATION

[72] Inventors: Paul Thevis, Oberndorf; Adolf Schneider, Altoberndorf; Horst Jakubaschk, Oberndorf, all of Germany

[73] Assignee: Olympia Werke A.G., Wilhelmshaven, Germany

[22] Filed: May 3, 1971

[21] Appl. No.: 139,536

[30] Foreign Application Priority Data

May 22, 1970 Germany...............P 20 24 928.9

[52] U.S. Cl..................235/60 R, 235/62 A, 235/137
[51] Int. Cl....................G06c 23/00, G06c 15/26
[58] Field of Search..........235/60 R, 137, 62 A, 62 D, 235/140

[56] References Cited

UNITED STATES PATENTS

| | | | |
|---|---|---|---|
| 3,034,716 | 5/1962 | Thevis | 235/137 |
| 3,468,480 | 9/1969 | Okuda et al. | 235/137 |
| 3,482,775 | 12/1969 | Piero et al. | 235/137 |
| 3,550,846 | 12/1970 | Burkhardt | 235/137 |

FOREIGN PATENTS OR APPLICATIONS

| | | | |
|---|---|---|---|
| 1,179,741 | 10/1964 | Germany | 235/60 R |

*Primary Examiner*—Stephen J. Tomsky
*Attorney*—Michael S. Striker

[57] ABSTRACT

The ordinal series of the pins of a pin carriage are sensed by ordinal sensing wheels which are advanced and returned by a common reciprocating drive bar carrying a connecting spring for each sensing wheel. The first end of the connecting spring abuts a step of a rim portion and the second end abuts a spoke portion of the same sensing wheel in the zero position. The set pin stops the sensing wheel during advance movement in the corresponding digital position, so that the first end of the connecting spring passes this step while the drive bar moves on with the other connecting springs to sense the set pins of the other orders. During the return of the sensing wheels, the second ends of the connecting springs act successively on the respective spoke portions to return all sensing wheels to the zero position.

12 Claims, 4 Drawing Figures

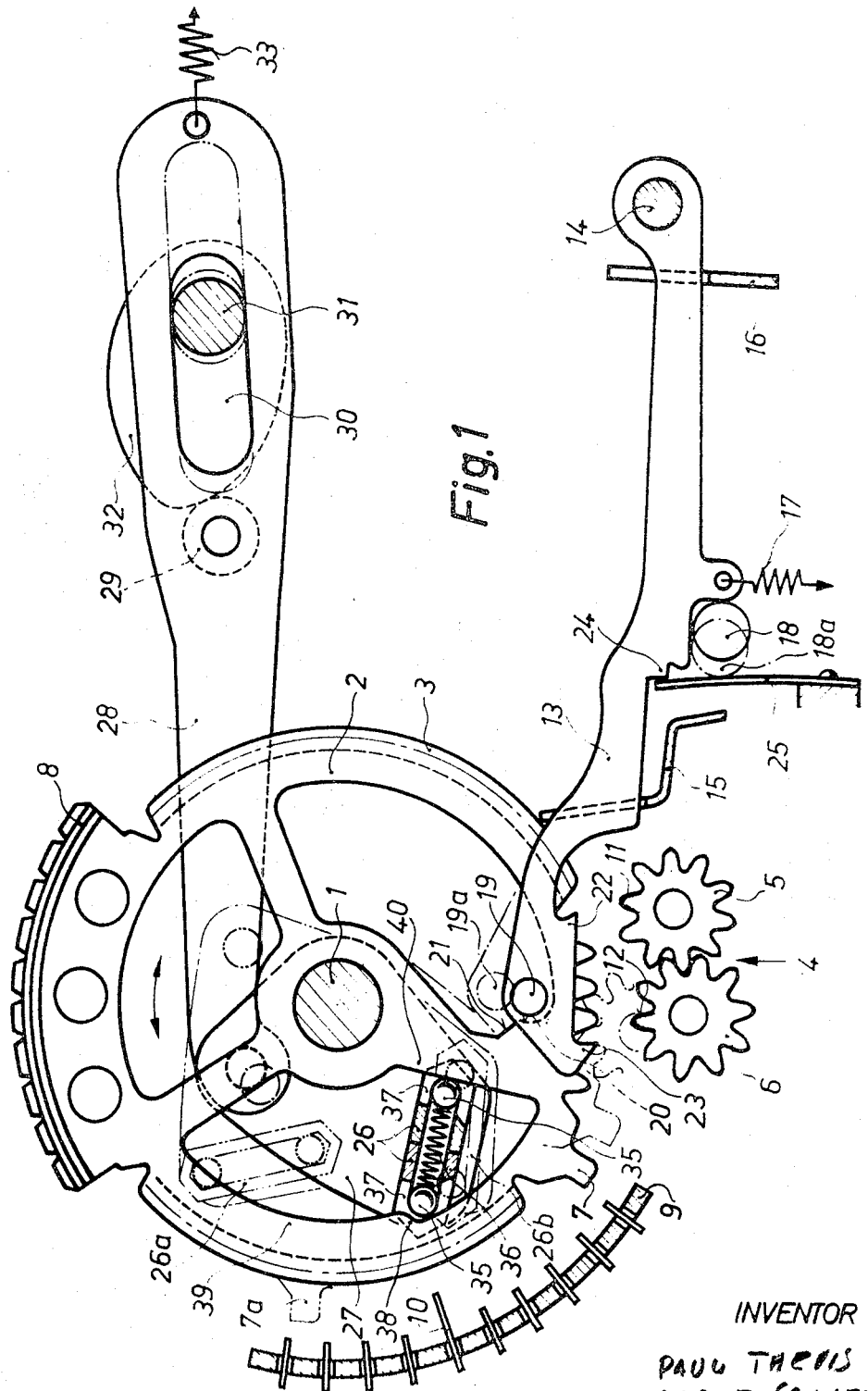

INVENTOR
PAUL THEIS
ADOLF SCHNEIDER
HORST JAKUBASCH

APPARATUS FOR SENSING DIGITAL INFORMATION

BACKGROUND OF THE INVENTION

The present invention is concerned with apparatus in which sensing wheels sense the information set in a pin carriage, and serve either as printing wheels, or transfer the sensed information to a storage counter.

In the German Pat. No. 1,179,741, each sensing wheel is associated with two springs, one spring constructed as a coil spring connecting the sensing wheel with a drive member, so that during the first half of a cycle of operation of the calculator, the respective sensing wheels are pulled by the tensioned coil spring to sense the operative pins of the pin carriage. A second spring is constructed as a torsion spring having two legs, one of which is fixedly connected with the sensing wheel, while the other yieldingly engages a projection of the sensing wheel, and also cooperates with the drive member. It is necessary to construct the torsion spring stronger than the coil spring. During the second half of a machine cycle, and during the return movement of the drive means, the sensing wheel is returned by the torsion spring to a zero position, moving a distance corresponding to the respective digit. The apparatus of the prior art permits the sensing wheel of the next higher order to move beyond the normal zero position due to the action of the drive means on the torsion spring, if a tens transfer is required. The force of the weaker coil spring is overcome.

However, if no tens transfer is required, and the sensing wheel is prevented by a stop to completely follow the return movement of the drive means, the leg of the torsion spring, which abuts a projecting portion of the sensing wheel, resiliently yields.

The known apparatus has the disadvantage that two different springs have to be provided for each sensing wheel, namely a coil spring and a torsion spring. The resilient forces exerted by the two springs must be carefully adjusted to each other, since during the tens transfer, the torsion spring must also overcome the force of the coil spring. By this fact, the speed of the tens transfer is detrimentally affected. A great number of parts is required which results in time consuming assembly operations, and a great deal of space is required in axial direction of the set of sensing wheels.

SUMMARY OF THE INVENTION

It is one object of the invention to provide an apparatus for sensing input information which can be easily assembled, requires little space, and reliably operates even at high speed operations of a calculator.

Another object of the invention is to connect a drive means with a sensing wheel for forward and return movement by means of a single compression spring whose ends engage, respectively, two portions of the same sensing wheel.

A drive member turns a sensing wheel by a compression spring, one end of which is compressed during forward movement of the sensing wheel, and the other end of which is compressed during return movement of the sensing wheel.

In accordance with the invention, the drive means for each sensing wheel includes resilient connecting means effective in opposite direction, and extending between an advance portion having a coupling step, and a return portion of the same sensing wheel.

An embodiment of the invention comprises a plurality of ordinal series of digital stops, any one of which is settable to a blocking position; a plurality of ordinal sensing means, preferably wheels mounted on a common shaft, aligned with the series of digital stops, each sensing means including an advance portion formed with a coupling step, a return portion, and a stop portion, each sensing means being mounted for movement between a series of digital positions in which the stop portion successively passes the correlated series of stops and engages the stop set to the blocking position; and a reciprocating drive means including a plurality of connecting means for operating the sensing means, respectively, each connecting means having a first end resiliently engaging the coupling step and a second end resiliently engaging the return portion of the correlated sensing means when the sensing means is in an initial zero position.

When advance movement is transmitted by the first end of the connecting means to the coupling steps of the correlated sensing means, the latter advance until the respective digital stop set to the blocking position stops the sensing means in the digital position representing the digit of the respective digital stop.

Thereupon, the first end of the respective resilient connecting means resiliently yields and passes the respective coupling step while the second end of the connecting means moves away from the return portion.

During the return movement of the drive means and connecting means, the second ends of the connecting means successively resiliently engage the return portions, and return the sensing means to the initial zero position.

The invention has several advantages. For the sensing of the pins or stops of the pin carriage, for the driving of a revolution counter by gears of the sensing wheels, and for the tens transfer, for each order only a single resilient connecting means is necessary, which is mounted on a reciprocating drive bar common to all sensing means, and being effective not only during the advance movement during which the pin carriage is sensed, but also during the return movement to the initial position. The resilient connecting means transmits all the force from the drive means to the sensing means. Consequently, assembly of the apparatus is facilitated, and no damage can be done to the resilient elements or to the tens transfer device. Since the resilient connecting means always abuts at both ends on portions of the respective sensing means, during the advance sensing movement as well as during the return movement for a totalizing operation, the sensing means cannot bounce back, and are safely retained in the sensing positions. The force exerted by the resilient connecting means is substantially constant for the entire operation.

In the preferred embodiment, the resilient connecting means include a compression spring having at least one ball at one end, and in a modification a ball on each end, for engaging with the respective portions of the respective sensing means. In the preferred embodiment of the invention, one of the balls engages in the zero position a coupling step, and passes beyond the same during the sensing movement, permitting a rolling motion of the ball which reduces wear when the resilient connecting means is compressed to pass over the coupling step.

In order to protect the compression springs of the resilient connecting means, they are preferably mounted in inner cavities of a drive beam. It is advantageous to make the beam comb-shaped of a synthetic thermoplastic material, so that slots are formed which open the ends of the cavities, and guide the advance portion and return portion of the respective sensing means while the same are engaged by the ends of the spring. The slots have such a width that the respective portions of the sensing means are laterally guided in the region where the compression springs and respective balls exert a resilient force.

In a modified embodiment of the invention, a drive beam passes through all sensing wheels and has a resilient comb with pairs of prongues. One prongue of each pair resiliently engages the coupling step of the advance portion of the sensing means, and the other spring of the pair engages the return portion when the respective sensing means is in the zero position, or has not yet been stopped by a set pin of the pin carriage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a fragmentary side elevation illustrating an embodiment of the invention;

DESCRIPTION OF THE PREFERRED EMBODIMENT

Figure 4:
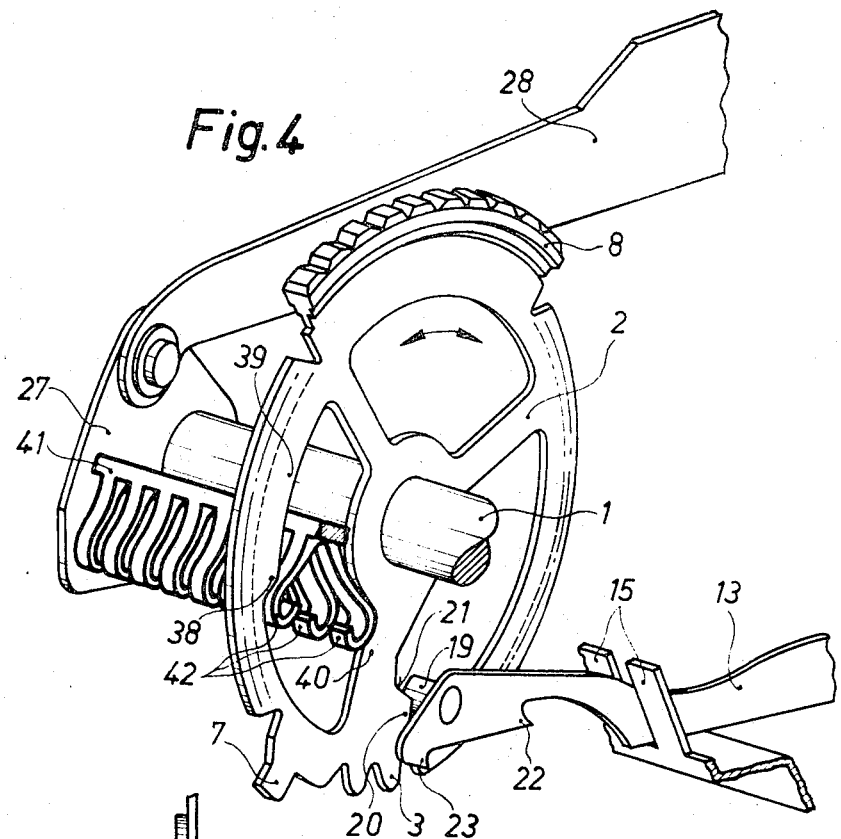
FIG. 4 is a fragmentary perspective view illustrating another embodiment of the invention provided with a resilient comb forming a plurality of resilient connecting means.

As shown in FIGS. 1 and 4, a stationary shaft 1 which is fixedly mounted in the frame of the calculator, not shown, ordinal wheels 2 are mounted for rotation between 10 angular digital positions in which digital types of a printing portion 8 are, respectively, in an operative position, so that, when a platen is moved into contact with the selected types forming a row, a number is printed. A storage counter means 4 has additive ordinal counter wheels 5, and subtractive counter wheels 6 and is mounted for angular movement between two positions in which the additive ordinal gears 6 or the subtractive gears 5 mesh with gear teeth 3 provided along the circular periphery of the respective ordinal wheel 2. In this manner, digital information stored in the plurality of ordinal wheels 2, can be stored in the storage counter means 4 in additive or subtractive sense, and it is also possible to form additive or subtractive sub-totals or totals when the gears 5 or 6 mesh with a toothed portion 3 of the wheels 2.

A storage counter, not shown, may be mounted on the right of the wheels 2, as viewed in the drawing, provided with ordinal gears meshing with the gear teeth 3.

Each ordinal wheel 2 has an outwardly projecting stop portion 7, and each stop portion 7 and wheel 2 cooperates with a row of pins of a pin carriage 9, the pin 10 being shown set to an operative blocking position located in the path of movement of stop portion 7. The setting of a selected pin for each order and wheel 2, is carried out by key means of a conventional calculator, not shown. Ten pins 10, associated with the digits from 0 to 9, in the upward direction, cooperate with each stop portion 7, so that each wheel 2 can be stopped by a set pin 10 in an angular position representing the same digit as the set pin 10, and the same digit may be printed by the respective type of the printing portion 8, or transferred into the storage counter 4 when the same is placed in a position in which either gears 5 or gears 6 mesh with the gear teeth 3. In order to transfer information to the counter 4, or to print information by printing portion 8, the digital information introduced into the pin carriage 9 by setting selected pins 10, must be first sensed by the ordinal wheels 2, and consequently wheels 2 are referred to as "sensing wheels" or as "sensing means" in the present application.

The ordinal gears 5 and 6 of the counter 4 have 10 gear teeth, one of which, 11 and 12, respectively, is associated with the digit 0 and the tens transfer. A tens transfer lever 13 is provided for each order, except the highest. All tens transfer levers 13 are mounted on a common stationary shaft for angular movement, and are guided in a guide comb 15 which has a slot for each lever 13. Each lever 13 has two projecting noses 22 and 23, cooperating with the gear teeth 11 and 12. A stud 19 projects from each lever 13 into an opening in the sensing wheel 2 of the next higher order to a position cooperating with an abutment 20 of the same. A spring 17 is secured to each tens transfer lever 13 and urges the same to turn in counterclockwise direction until abutting a stop bar 18 crossing all levers 13. Stop bar 18 can be operated by the cyclically operating drive means of the calculator to move to the position 18a shown in chain lines, in which all leaf springs 25, which are fixedly mounted on the frame of the machine, can be deformed to move out of a recess below a shoulder 24 to the position illustrated in FIG. 1, abutting shoulder 24.

When a tens transfer lever 13 is operated by one of the tens transfer teeth 11 or 12 engaging the noses 22 or 23, to turn in clockwise direction about shaft 14, the upper end face of the respective leaf spring 25 moves into the recess below shoulder 24 which is possible since stop bar 18 is in the position shown in solid lines. When a leaf spring 25 is located in this recess, the respective lever 13 is arrested in its higher angularly displaced position in which the stud 19 is in the position 19a shown in chain lines in FIG. 1, spaced from the abutment 20, and located outside of the path of movement of abutment 20 with sensing wheel 2 in counterclockwise direction. In the initial position shown in FIG. 1, stud 19 in the position 19a, is located opposite a slanted guide face 21 on a spoke portion. In the course of the operational cycle of the machine, stop bar 18 is displaced to the position 18a and releases all springs 25 from the recess below shoulder 24, so that spring 17 turns the respective lever 13 back to the illustrated position abutting stop bar 18 which is moved back to the position illustrated in solid lines. Due to the fact that the respective lever 13 turns a small angle in counterclockwise direction due to the action of spring 17, stud 19 in the position 19a moves to a position abutting the slanted guide face 21 so that the respective sensing wheel 2 is turned in clockwise direction to the initial position shown in FIG. 1, if it was displaced beyond this initial position in counterclockwise direction, as shown in chain lines, particularly for stop portion 7.

In the normal initial zero position, stop 7 is aligned with a pin of pin carriage 9 representing the digit 0, and when a sensing wheel 2 is in the angular position representing the digit 9, stop portion 7 is in the position 7a shown in chain lines cooperating with the pin of pin carriage 9 representing the digit 9.

A pair of plates 27, only one of which is shown in FIG. 1 and 4, are mounted for angular movement on the stationary shaft 1, axially spaced from each other so that the sensing wheels 2 are located between the plates 27. At least to one plate 27, a drive lever 28 is pivotally connected, so that reciprocation of the drive lever 28 causes angular displacement of the plates 27 about the axis of shaft 1.

A drive shaft 31 extends parallel to shaft 1 and is located in the slot 30 of drive lever 28. An oval cam 32 is secured to shaft 31, and cooperates with a roller 29 mounted on drive lever 28. A spring 33 is secured to the end of lever 28 and to a stationary frame part, not shown, and urges lever 28 to a position in which cam follower roller 29 engages the peripheral cam track of cam 32, so that during rotation of shaft 31 with cam 32, drive lever 28 performs a reciprocating motion by which the respective plate 27 is angularly reciprocated.

A bar 26, passing through openings in the sensing wheels 2, connects the two plates 27 so that the provision of a second reciprocating drive lever 28 and cam 32 for the second plate 27 is not absolutely necessary.

During reciprocating movement of drive lever 28, and angular reciprocation of plates 27 about shaft 1, bar 26 will move from the position shown in solid lines to the position 26a shown in broken lines.

Figure 2:
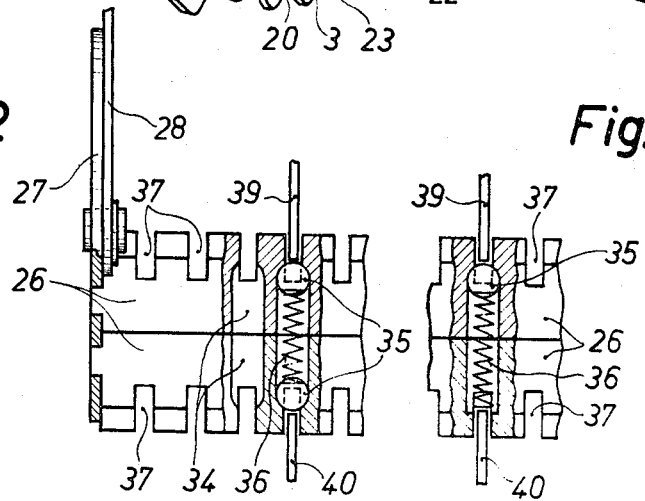
FIG. 2 is a fragmentary plan view, partially in section, illustrating a drive means with resilient connecting means as used in the embodiment of FIG. 1.

As also shown in FIG. 2, drive bar 26 consists of two bar parts longitudinally abutting each other. The bar parts have slots 37, spaced the same distance as the sensing wheels 2, so that a rim portion 39, and a spoke portion 40 of each sensing wheel 2 is located in a pair of outwardly open slots 37 provided in the two bar parts 26, as shown in FIG. 2 for one sensing wheel.

The inner abutting faces of the two bar parts 26 have blind bores 34 which together form a cavity in which a spring 36, shown to be a single coil spring, is located. Balls 35 are provided at the ends of each spring 36 in the embodiment of FIG. 2, but in the modified construction shown in FIG. 3, a ball 35 is only provided at the end of the spring which cooperates with the rim portion 39, while the other end of spring 36 directly abuts the spoke portion 40.

The open outer slots 37 penetrate into the bottom portions of the blind bores 34, so that movement of bar 26 toward the rim portion 39 will cause compression of the respective end of spring 36, while movement of bar 26 toward the spoke portion 40 will cause compression of the other end of the respective spring 36.

The rim portion 39 and the spoke portions 40 are laterally guided in the open slots 37 in the region where pressure is exerted by the drive bar 26 and the resilient connecting means 35, 36.

The bar parts 26 are preferably made of thermoplastic material so that the blind bores 34 and the slots 37 can be inexpensively made. Between the two bar parts 26, springs 36 and balls 35 are fully protected after an easy assembly operation. An overloading of springs 36 cannot take place.

Referring again to FIG. 1, the rim portion 39 has an inner surface formed with a coupling step 38. In the initial zero position of the apparatus, ball 35 abuts coupling step 38. Since angular movement of plates 27 with bar 26 in clockwise direction will cause angular movement of the sensing wheels 2 in clockwise direction, rim portion 39 will be referred to as "advance portion," and since turning movement of plates 27 in counterclockwise direction will cause return movement of sensing wheels 2, the spoke portion 40 will be referred to as "return portion." During clockwise advance movement, the left end of the resilient connecting means 35, 36 will act on advance portion 39, and more particularly on coupling step 38, and during return movement of wheel 2 in counterclockwise direction, the right end of connecting means 36, 35 will act on the return portion 40.

The embodiment of FIG. 1 is operated as follows:

In the initial zero position shown in solid lines in FIG. 1, the counter 4 is in a position in which the additive and subtractive counter gears 5 and 6 are both spaced from the teeth 3 of the sensing wheels 2. The stop portion 7 is located in the region of the pin 10 associated with the digit 0. The coupling step 38 of the advance portion 39, and the edge of the return portion 40 are located in opposite slots 37 of bar 26. Tens transfer levers 13 are in positions in which studs 19 are located opposite abutments 20 of the next higher order. Since shaft 31 and cam 32 are stopped, each sensing wheel 2 is blocked in the zero position by the resilient connecting means 35, 36.

A number is entered into the pin carriage by operation of the keys of the calculator, not shown, so that in each order of the pin carriage 9, a pin 10 is set to an operative position, located in the path of movement of the stop portion 7 of the respective sensing wheel 2 of the same order. A pin 10, representing digit 5, is shown in FIG. 1 to be set to an operative position.

Rotation of shaft 31 is started so that cam 32 permits drive lever 28 to move to the right as viewed in the drawing due to the action of spring 33. Plates 27 turn in clockwise direction about shaft 1 and move bar 26 with the resilient connecting means 35, 36. Since the end of the resilient connecting means abuts the coupling shoulders 38, all sensing wheels 2 are turned in clockwise direction, except a sensing wheel 2 in whose order a pin was set representing the digit 0 against which the respective stop portion 7 would abut.

The sensing wheels 2 are turned in counterclockwise direction until the respective stop portion of each sensing wheel 2 abuts the set pin 10 in the operative position in the respective order of the pin carriage.

When a sensing wheel 2 is stopped by a set pin 10, coupling step 32 exerts a force on the resilient connecting means 35, 36, compressing the spring 36 so that the respective ball 35 continues its movement on the advance portion 39. At the same time, the other end of the resilient connecting means 35, 36 moves away from the return portion 40. If the digit 9 was set in an order of the pin carriage, the respective sensing wheel 2 is stopped when stop portion 7 is in the position 7a, and drive bar 26 is in the position 26a shown in broken lines, still engaging the coupling step 38 of the respective order.

Since the left end of the connecting means 35, 36 exerts resilient pressure on the advance portion 39, the respective sensing wheels are held against the respective set stops 10 in the operative position.

All sensing wheels 2 are now in angular digital position representing the same digit as the pin 10 of the pin carriage 9 selected in the respective order. A platen, not shown, may be moved toward the printing portion 8 to receive an imprint of the selected number.

The same operations are carried out if a sub-total or total is to be formed, but the gears of counter 4 are placed in meshing engagement with the gear teeth 3 of the sensing wheels 2 before the operation starts.

During the second half of the machine operation, during which the additive ordinal gears 5 may mesh with the gear teeth 3 of the sensing wheels 2, cam 32 moves drive lever 28 in the opposite direction so that plates 27 and bar 26 turn in counterclockwise direction about shaft 1. The balls 35 at the right ends of the resilient connecting means 35, 36 successively abut the return portions 40, and the left balls 37 successively engage the coupling steps 38 of the respective sensing wheels 2. Thereafter, resilient pressure is exerted by the right ends of the connecting means 36, 35 on the return portions 40 to return all sensing wheels to the initial zero position. In this position, the abutments 20 of the sensing wheels 2 abut the studs 19 of the tens transfer levers of the respective next lower order. The stop portions 7 are aligned with the pins of the pin carriage 9 representing the digit 0. The ordinal gears of the counter 4 are turned by the respective ordinal sensing wheels 2 so that the number introduced into the pin carriage by key operation, is now stored in the counter 4, in an additive sense.

However, the return movement of drive bar 26 with connecting means 35, 36 is not yet completed. The cam 32 operates lever 38, plates 27, and drive bar 26 so that drive bar 26 with the resilient connecting means 35, 36 turns another step so that the springs 36 are tensioned at the right ends which resiliently abut the return portions 40 of the sensing wheels 2 blocked by the engagement between studs 19 and abutments 20. The compression of spring 36 during this step stores energy for a continued tens transfer.

Assuming that the number 16 is to be added to a number 34 already stored in the counter 4, the additive counter gear 5 of the second order has turned in clockwise direction from the position representing the digit 3 to the position representing the digit 4, while the gear 5 of the unit order has turned in clockwise direction from the position representing the digit 4 to the position representing the digit 9 and then one further step to the position representing the digit 0. The zero tooth 11 of the unit gear 5, which abuts the nose 22, turns the tens transfer lever 13 of the unit order in clockwise direction about the shaft 14, in which position the transfer lever 13 is arrested by leaf spring 25 engaging the recess below shoulder 24. Stud 19 of lever 13 of the unit order, which cooperates with the sensing wheel 2 of the next higher order, is now located in the position 19a opposite the slanted surface 21 of the sensing wheel 2 of the second order, but out of the path of movement of abutment 20 of the respective sensing wheel 2.

Due to the fact that the bar 26 with the connecting means 35, 36 were turned one extra step in counterclockwise direction to the position 26b shown in chain lines, which caused compression of spring 36, the sensing wheel 2 of the second order is turned in counterclockwise direction a further step by the action of the compressed resilient connecting means 35,36 which moves to the position shown in chain lines so that the gear 5 of the second order of counter 4 is turned from the position representing the digit 4 to the position representing the digit 5 for storing the number 50 in counter 4.

After a tens transfer has been carried out, counter 4 is moved in the conventional manner to a position in which the gears 5 do not mesh with the gear teeth 3 of the sensing wheels. Thereupon, the drive bar 26 is moved under the control of cam 32 and lever 28 to the initial described zero position, and the stop bar 18 is moved to the position 18a to release levers 13 from leaf springs 25. Spring 17 pulls then the respective tens transfer levers 13 to the normal position in which each stud 19 is located opposite the abutment 20 of the sensing wheel 2 of the respective next higher order, blocking the same against counterclockwise movement.

The apparatus is particularly suitable for a continued tens transfer operation during which a unit is carried to an order in which the respective wheel is in the position 9 so that another tens transfer is required. In the example 997 + 6 = 1,003, a tens transfer takes place from the unit order to the second order, as described above, from the second order to the third order and from the third order to the fourth order, continued tens transfers take place which depend on the tens transfer from the unit order to the second order, and are carried out by the force of the compressed resilient connecting means 36, 35 which are all storing energy since the bar 26 was moved one step after stopping of the sensing wheels by the stud 19.

Figure 3:
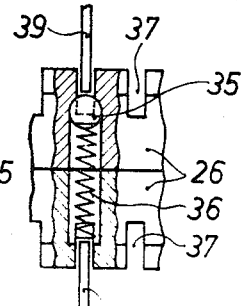
FIG. 3 is a fragmentary plan view, partially in section, illustrating a modified construction of the resilient connecting means.

As described with reference to FIG. 3, only one ball 35 may be provided at one end of the compression spring 36 for cooperation with the advance portion 39. Since the left end of the connecting means 35,36 as viewed in FIG. 1 moves along the advance portion 39, while there is no relative movement between the right end of the resilient connecting means 35,36 and the return portion 40, the ball shown at the right end of FIG. 1 can be omitted.

The construction, and principle of operation of the embodiment of FIG. 4 is the same as described with reference to FIG. 1. However, the resilient connecting means are modified. The two plates 27, of which only one is shown in FIG. 4 support the ends of a spring comb 41 which has pairs of resilient prongs 42 curved in opposite direction. Each pair of resilient prongues 42 cooperates with the advance portion 39 and the coupling step 38, and with the return portion 40 of one sensing wheel 2.

During turning of plates 27 with the series of pairs of prongs 42 in clockwise direction about shaft 1, the spring prongs 42 abutting the coupling steps 38 turn the respective sensing wheels 2 in clockwise direction until the sensing wheels 2 are successively stopped by the respective stop portion 7 abutting pins of the pin carriage selected in the respective order. Thereupon, the left prong moves along the inner surface of the advance portion 39. During the return movement of the spring comb 41 in counterclockwise direction, the spring prongs 42 on the right, which separated during the preceding movement from the return portion 40, successively engage the same and turn the respective sensing wheels 2 until they arrive in the zero position. As described with reference to FIG. 1, cam 32 and lever 28 turn plates 27 with spring comb 41 one step further, so that the spring prongs 42 on the right, which engage the return portions of the blocked sensing wheels 2, are resiliently deformed and store energy, which is used for turning the respective sensing wheel 2 an additional step if a tens transfer is required. If a counter gear 5 or 6 is turned to a position requiring a tens transfer, it operates the respective tens transfer lever to unlock the respective sensing wheel 2 so that the energy stored in the spring prongue 42 abutting the return portion 40 is used for turning the sensing wheel 2 one angular step in counterclockwise direction for representing the correct digit in the respective next higher order.

It will be understood that each of the elements described above, or two or more together, may also find a useful application in other types of apparatus for sensing digital information differing from the types described above.

While the invention has been illustrated and described as embodied in a single resilient connecting means connecting each sensing wheel with a common drive member for transmission of driving forces in opposite directions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Apparatus for sensing digital information, comprising a plurality of ordinal series of digital stops, any one stop of each series being settable to an operative blocking position; a plurality of ordinal sensing means respectively aligned with said series of digital stops, each sensing means including an advance portion formed with a coupling step, a return portion, and a stop portion, each sensing means being mounted for movement between a series of digital positions in which said stop portion successively passes the correlated series of stops, and engages the stop set to said blocking position; and reciprocating drive means including a plurality of connecting means for operating said sensing means, respectively, each connecting means having a first end resiliently engaging said coupling step and a second end resiliently engaging said return portion of the correlated sensing means when said sensing means is in an initial zero position so that, when advancing movement is transmitted by said first ends of said connecting means to said coupling steps of the correlated sensing means, the latter advance until the respective digital stop set to said blocking position stops said sensing means in the digital position representing the digit of the respective digital stop whereupon said first end of the respective connecting means resiliently yields and passes the respective coupling step while said second end of said connecting means moves away from said return portion, and so that during return movement of said drive means and connecting means, said second ends of said connecting means successively resiliently engage said return portions and return said sensing means to said initial position.

2. Apparatus as claimed in claim 1 wherein each said resilient connecting means includes a compression spring having said first and second ends and being compressed at said coupling step by pressure on said first end during said advance movement, and by pressure on said second end during said return movement.

3. Apparatus as claimed in claim 2 wherein said connecting means includes a ball at said first end resiliently urged by said compression spring against said coupling step and advance portion.

4. Apparatus as claimed in claim 3 wherein said connecting means includes another ball at said second end resiliently urged by said compression spring against said return portion.

5. Apparatus as claimed in claim 1 wherein said drive means include a reciprocating drive bar extending between said advance portions and said return portions of said plurality of sensing means, and having a plurality of cavities in which said resilient connecting means are mounted, respectively, said first ends and second ends projecting from opposite sides of said drive bar into resilient engagement with said advance and return portions of the respective sensing means.

6. Apparatus as claimed in claim 5 wherein said drive bar includes two abutting bar parts; wherein each cavity includes two blind bores in said bar parts, respectively, wherein each resilient connecting means is located in the respective two blind bores; wherein each of said two bar parts has a series of outer open slots extending into the ends of said blind bores so that a pair of slots opens the ends of each cavity; and wherein said advance portions and return portions of each sensing means are located in a pair of correlated slots engaged by the first and second ends of the respective resilient connecting means.

7. Apparatus as claimed in claim 6, wherein each said connecting means includes a compression spring, and one ball at least at said first end of said connecting means retained by the bottom of said blind bore and engaging one end of said compression spring for being urged into engagement with said advance portion and coupling step of the respective sensing means.

8. Apparatus as claimed in claim 7 wherein said slots laterally guide said advance and return portions located therein for guiding the respective sensing means; and wherein said bar parts are made of a synthetic thermoplastic material.

9. Apparatus as claimed in claim 1 wherein said drive means include a reciprocating spring comb extending between said advance and return portions of said series of sensing means, and having pairs of resilient prongs aligned with said sensing means, respectively, one prong of each pair resiliently abutting said advance portion and the other prong of each pair resiliently abutting said return portion of the respective sensing means in said initial zero position so that said pairs constitute said resilient connecting means, respectively.

10. Apparatus as claimed in claim 1 comprising a shaft; wherein said plurality of sensing means is a plurality of sensing wheel means mounted on said shaft for rotation between angular digital positions, each sensing wheel including a rim portion having said advance portion and coupling step, and a spoke portion having said return portion; wherein said drive means include a reciprocating drive bar passing through said sensing wheels between said rim and spoke portions and having a plurality of cavities in which said resilient connecting means are mounted, respectively; and wherein said first and second ends of said connecting means are located on opposite sides of said drive bar, and resiliently engage said advance and return portions, respectively.

11. Apparatus as claimed in claim 10 wherein each sensing wheel has a peripheral printing portion with digital types representing the digits represented by said sensing means in said digital angular positions, and peripheral gear teeth spaced from said printing portion; and comprising storage counter means including an additive counter and a subtractive counter, and having ordinal gears, and being operable for placing the gears of one of said counters in meshing engagement with said gear teeth of said sensing wheels during the return movement of the latter.

12. Apparatus as claimed in claim 11 including a plurality of tens transfer means respectively cooperating with said ordinal gears of said storage counter means, and with said sensing wheel of the respective next higher order for blocking the same in the initial zero position when no transfer is required, and actuated by said storage register, when a transfer is required, to release said sensing wheel so that the same is turned by said resilient connecting means to the next following digital position.

* * * * *